Nov. 24, 1936.   G. B. PICKOP   2,062,145
PIPE FITTING
Filed Dec. 9, 1935
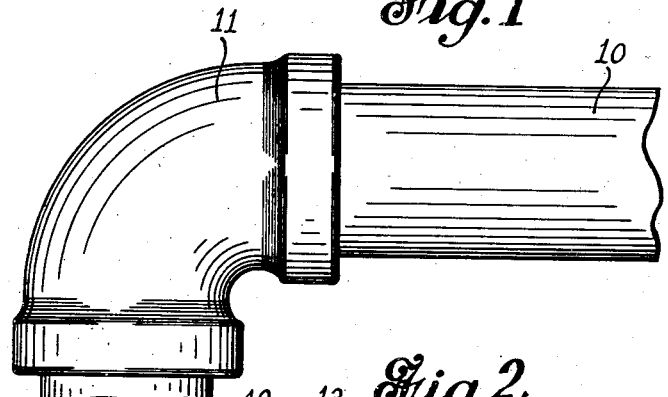
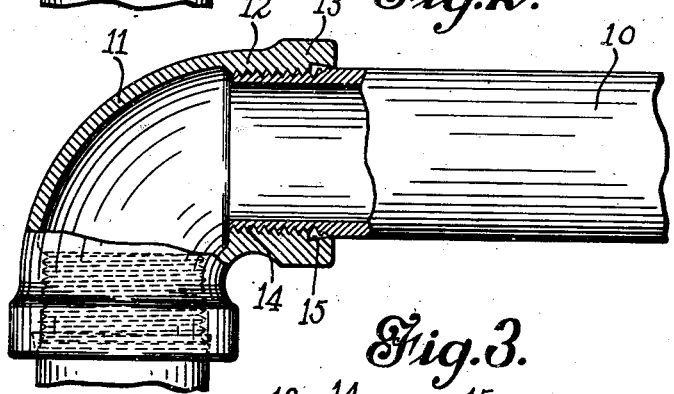
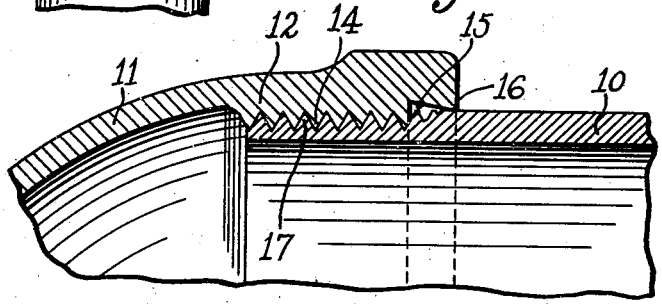
Inventor
George B. Pickop
By Rockwell & Barchtow
Attorneys Patented Nov. 24, 1936

2,062,145

UNITED STATES PATENT OFFICE 2,062,145

PIPE FITTING

George B. Pickop, New Haven, Conn., assignor to The New Haven Vibrator Company, Inc., New Haven, Conn., a corporation of Connecticut Application December 9, 1935, Serial No. 53,476

2 Claims. (Cl. 285—145)

This invention relates to pipe couplings or fittings, and more particularly to the joint between a section of pipe and a fitting such as a coupling, elbow or T, designed so as to prevent the pipe from rusting or corroding and thus developing leaks or weakness.

In the manufacture of pipes and fittings therefor, the parts are all made to a standard as to sizes, and also as to the cooperating threads. An elbow, for example, is made of a certain size and has a certain length of thread therein to receive the thread of the pipe connected to it. Also the pipe is threaded more or less to a standard so that it will enter the threads of the elbow a sufficient distance to make a fit, or until the female and male threaded tapered faces are made up snug. In order to provide this relation of the parts there will usually be two or three threads on the pipe which do not enter the coupling. The thread on the end of the pipe is somewhat longer than the thread in the coupling, and a few threads of the pipe will remain in exposed position after it has been screwed home. As the pipe is galvanized before the threads are cut, the threaded portion will, of course, be ungalvanized, and these exposed threads of the pipe will be subject to rust and corrosion, and for that reason a failure in the pipe at this point often results.

One object of the present invention is to provide such a joint between a pipe and a coupling or fitting that the threaded end of the pipe will be effectively covered so that it will not be in exposed position.

A still further object of the invention is the provision of a pipe coupling of such a character that it will receive the entire threaded portion of the pipe to be connected thereto, and at the same time will make tight contact with the pipe at a point above the threaded portion to prevent water or extraneous substances reaching the pipe threads.

A still further object of the invention is the provision of a pipe coupling of such a nature that the entire threaded portion of a pipe connected to the coupling will be effectively protected from rust or corrosion.

To these and other ends the invention consists in the novel features and combinations of parts to be hereinafter described and claimed.

In the accompanying drawing:

Fig. 1 is an elevational view of a pipe and pipe fitting embodying my invention;

Fig. 2 is a sectional view of the joint between the pipe and pipe fitting; and

Fig. 3 is an enlarged fragmentary sectional view showing the joint between the pipe and fitting.

It will be understood that the embodiment of my invention which I have selected to show in the drawing is merely by way of illustration, and that the invention may take other forms and be employed with fittings of a different character from the one shown without departing from the novel principles involved.

In Fig. 1 of the drawing I have shown a pipe 10 connected to an elbow 11. It will be understood, of course, that the elbow shown is merely one type of coupling or fitting which may be applied to the pipe, and that the invention is adapted for use with a union, a T, a collar, or other coupling member as well as with an elbow.

The elbow 11 may be slightly elongated with respect to its straight ends 12 as compared to the ordinary fitting. At its ends the elbow is somewhat enlarged at the portion at which the bands 13 are provided, and in the form of elbow shown these bands are slightly wider than is usual on the standard fitting. The interior of the portion 12 of the elbow is provided with the standard thread 14, the thread portion being of the standard length in use upon such members at the present time.

Referring to Figs. 2 and 3, it will be seen, however, that while the threaded portion of the elbow is of standard length, the thread does not extend to the outer surface of the fitting, but between the threaded portion and the outer surface a recess 15 is provided. The extra length of the end of the elbow described above provides the material for this recess in addition to the standard length of thread. It will be noted that the recess is somewhat V-shape in character in that the peripheral wall thereof is inclined, so that this wall of the recess slopes outwardly from the outer edge of the fitting toward the threaded portion and has its maximum depth adjacent the threaded portion of the elbow.

This peripheral wall of the recess meets the outer face of the fitting so as to provide a relatively sharp edge 16 defining the entrance opening into the elbow. This opening will be of a size designed to make a tight fit upon the pipe 10 on the outside diameter thereof above the threaded portion.

The pipe 10 is provided with the standard threads 17. It will be noted that the threaded portion of the pipe is somewhat longer than that of the fitting, but that the excess threads lie within the recess 15 and are, therefore, enclosed within the elbow.

The dies for cutting pipe threads are so arranged that the thread is cut on a slight taper, that is, the outside diameter of the threaded pipe at the finished end will be somewhat less than the outside diameter of the pipe or of the threads adjacent the unthreaded portion. For this reason the threaded end of the pipe will readily pass through the opening defined by the edge 16 without contact with this edge, and the pipe may be screwed home. When the pipe has been screwed in sufficiently to make a tight fit, the parts will be in the position shown in Fig. 3, wherein a tight joint is made between the threads 17 of the pipe and the threads 12 of the elbow. Also, the more remote threads of the pipe which do not engage those of the elbow will lie within the recess 15. When the unthreaded portion of the pipe reaches the end face of the coupling, it will bind tightly against the edge 16, which may either cut slightly into the pipe or itself be turned in slightly so that an absolutely tight joint will result between the edge 16 and the outside galvanized surface of the pipe. This effectively prevents any moisture or other extraneous matter entering the recess 15 to attack the threads and cause rust or corrosion. At the same time the excess of lead or litharge, or whatever sealing substance is used by the fitter, will be forced out into the recess 15 and will be trapped within the recess. This will also serve as a protection to the threads within the recess, and in addition will prevent the necessity of cleaning this more or less unsightly substance from the pipe.

It will be noted that as the internal threads in the fitting do not extend to the end of the fitting, these threads will be protected in packing and shipping by the extended recessed end of the fitting, and will not reach the fitter in nicked or burred condition. This will permit of easy and free engagement of the pipe threads therein when the fittings are made up, and will eliminate much trouble in that respect which is experienced at the present time. It will also be noted that the opening of the fitting is defined by a relatively sharp edge formed between the outside end face of the fitting and the flaring peripheral wall of the recess. This opening, as has been stated, is slightly smaller than the outside diameter of the pipe so as to make a tight fit thereon. It may sometimes occur, as pipes are not always exactly round, that the opening may not snugly engage the pipe about its entire periphery. If this occurs, the end of the fitting may be set down upon the pipe by a peening or caulking tool, but in the present case the turning of the thin edge of metal about the opening will provide caulking material to seal the space between the fitting and the pipe. The result is that the fitting will make a tight joint about the outside diameter of the pipe to protect against entrance of water or corroding material into the recess covering the excess threads upon the pipe, and also the lead or litharge used at the joint will be retained about the threads in the recess.

While I have shown and described a preferred embodiment of my invention, it will be understood that it is not to be limited to all of the details shown, but is capable of modification and variation within the spirit of the invention and within the scope of the appended claims.

What I claim is:

1. A hollow pipe fitting to receive a threaded pipe, said pipe fitting having an internally threaded portion terminating short of the end thereof and having an internal recess between said end and the adjacent end of the threaded portion, the meeting line of the peripheral wall of the recess and the end wall of the fitting forming a relatively sharp edge defining the pipe receiving opening, and said opening being slightly smaller than the outside diameter of the cooperating pipe.

2. A hollow pipe fitting to receive a threaded pipe, said fitting having an internally threaded portion terminating short of the end thereof and having an internal recess between said end and the adjacent end of the threaded portion, the meeting line of the peripheral wall of the recess and the end wall of the fitting forming a relatively sharp edge defining the pipe receiving opening, and said edge being adapted to engage the outside of, and be deformed by, the pipe received therein.

GEORGE B. PICKOP.